United States Patent [19]

Yasuhara

[11] Patent Number: 4,563,133

[45] Date of Patent: Jan. 7, 1986

[54] FUEL CUT SOLENOID VALVE FOR FUEL INJECTION PUMP

[75] Inventor: Seishi Yasuhara, Yokosuka, Japan

[73] Assignee: Nissan Motor Co., Ltd., Yokohama, Japan

[21] Appl. No.: 608,413

[22] Filed: May 9, 1984

[30] Foreign Application Priority Data

May 17, 1983 [JP] Japan .................................. 58-84957

[51] Int. Cl.4 ........................ F04B 49/02; F04B 39/08; F16K 31/02; F02M 41/00

[52] U.S. Cl. .................................... 417/295; 417/505; 251/129.15; 137/244; 123/449; 123/458

[58] Field of Search ................ 417/295, 505; 251/141; 137/244, 245; 123/449, 458

[56] References Cited

U.S. PATENT DOCUMENTS

| | | | |
|---|---|---|---|
| 2,691,388 | 10/1954 | Livers | 417/295 |
| 2,785,638 | 3/1957 | Moller | 417/505 |
| 2,927,576 | 3/1960 | Pringham | 123/449 |
| 3,409,035 | 11/1968 | Miller | 137/244 |
| 3,485,441 | 12/1969 | Eaton | 417/505 |
| 3,550,614 | 12/1970 | Englund | 137/245 |
| 3,728,989 | 4/1973 | Monpetit et al. | 123/458 |
| 3,842,809 | 10/1974 | King | 123/458 |
| 4,073,277 | 2/1978 | Eheim | 417/505 X |
| 4,460,025 | 7/1984 | Scholle et al. | 137/244 X |

FOREIGN PATENT DOCUMENTS

| | | | |
|---|---|---|---|
| 3200622 | 9/1982 | Fed. Rep. of Germany | 123/458 |
| 2302471 | 9/1976 | France | 251/141 |
| 2024314 | 1/1980 | United Kingdom | 417/295 |

*Primary Examiner*—Carlton R. Croyle
*Assistant Examiner*—Theodore Olds
*Attorney, Agent, or Firm*—Schwartz, Jeffery, Schwaab, Mack, Blumenthal & Evans

[57] ABSTRACT

A plunger is held in a position where it opens a fuel passage through abutment of a stopper upon an end of a cylinder. The stopper is made of a non-magnetic material and mounted on the plunger which is made of a magnetic material.

8 Claims, 11 Drawing Figures

FUEL CUT SOLENOID VALVE FOR FUEL INJECTION PUMP

BACKGROUND OF THE INVENTION

1. Field of the Invention

The present invention relates in general to fuel injection pumps for internal combustion engines and more particularly to fuel cut solenoid valves for distributor-type or so-called VE-type fuel injection pumps.

2. Description of the Prior Art

In a VE-type fuel injection pump, its working parts are lubricated by fuel to be delivered through the pump. Due to this, broken steel burrs, worn-off iron powder and the like magnetic solid particles may be suspended in the fuel flowing through a fuel passage which is opened or closed by a fuel cut solenoid valve. The fuel cut solenoid valve mainly consists of a cylinder, a solenoid placed around the cylinder, an armature or plunger movable in the cylinder between a first position where it opens the fuel passage and a second position where it closes the fuel passage, and a spring urging the plunger toward the second position. The plunger is moved to the first position when the solenoid is energized.

This kind of fuel cut solenoid valve has a disadvantage that it has a possibility of being disabled to close the fuel passage due to the fact that the suspended solid particles are attracted by the magnetized plunger to gather thereon and may go into the space between the cylinder and the plunger to cause them to seize up. When the plunger becomes fastened to the cylinder, an associated engine cannot be stopped through an ignition key. For the above reason, the prior art fuel cut solenoid valve cannot effect an assured and reliable operation.

SUMMARY OF THE INVENTION

A fuel cut solenoid valve of this invention comprises, as usual, a cylinder made of a non-magnetic metal, a plunger made of a magnetic material and movable in the cylinder between a first position where it opens a fuel passage and a second position where it closes the fuel passage, a solenoid placed around the plunger and operative, when energized, to urge said plunger toward the first position, and a spring urging the plunger toward the second position.

In accordance with the present invention, the fuel cut solenoid valve is further provided with a non-magnetic stopper mounted on the plunger. This stopper is adapted for abutment upon an end of the cylinder and thereby holding the plunger at the first position when the solenoid is energized.

The provision of the non-magnetic stopper is quite effective for preventing magnetic solid particles from going into the space between the cylinder and the plunger to cause them seize up.

It is accordingly an object of the present invention to provide an improved fuel cut solenoid valve for a fuel injection pump which is free from the disadvantages noted above and can provide an assured and reliable operation.

BRIEF DESCRIPTION OF THE DRAWINGS

The features and advantages of the fuel cut solenoid valve according to the present invention will become more clearly appreciated from the following description taken in conjunction with the accompanying drawings, in which:

FIGS. 7 to 11 are sectional views of modified embodiments of the present invention, in which FIG. 9 is a cross-sectional view taken along IX—IX of FIG. 10.

DESCRIPTION OF THE PREFERRED EMBODIMENTS

Referring to FIGS. 1 to 4, description is first made to a prior art fuel cut solenoid valve for a better understanding of an inventive step of the present invention.

Figure 1:
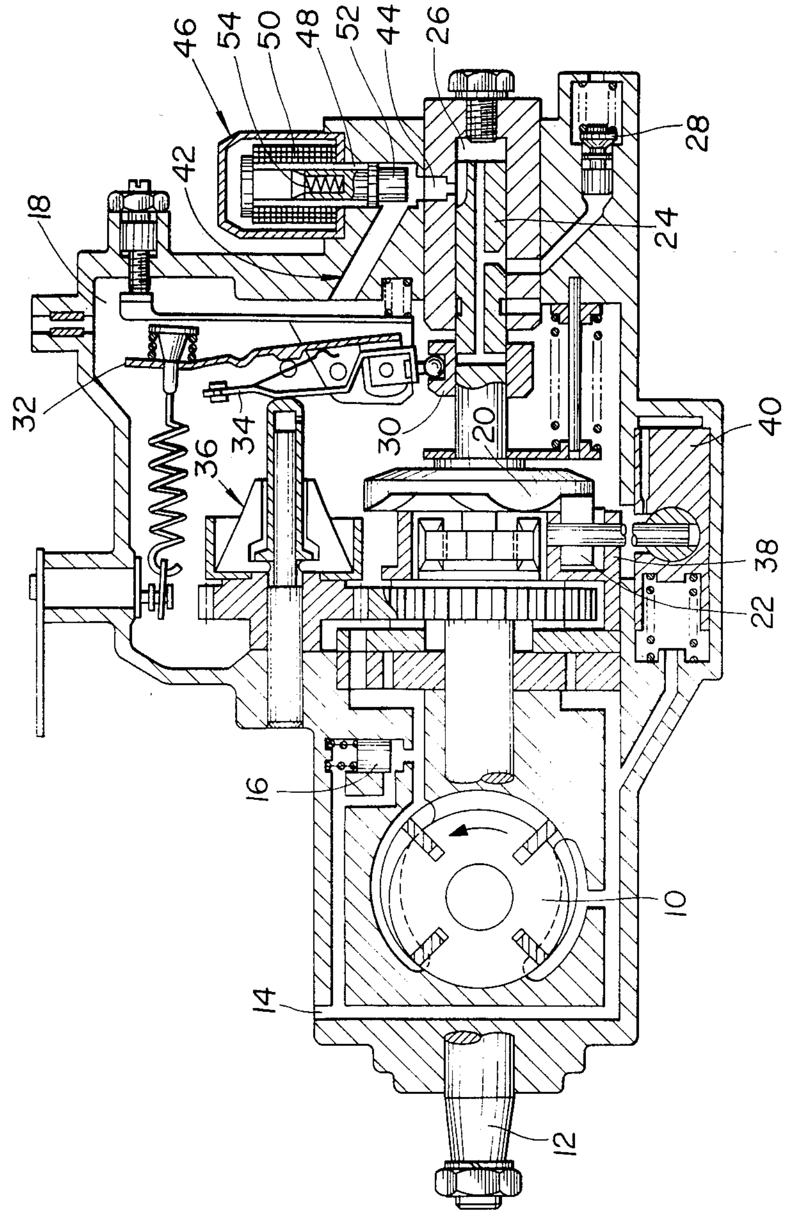
PRIOR ART FIG.1
FIG. 1 is a sectional view of a prior art VE-type fuel injection pump.

In FIG. 1, a VE-type fuel injection pump is shown as having a feed pump 10 which is driven by a drive shaft 12 connected to an output shaft (not shown) of an engine. When the feed pump 10 rotates, fuel is drawn through a fuel inlet port 14 and through a regulating valve 16 into a suction chamber 18. A cam disc 20 is caused by rotation of the drive shaft 12 and by rollers 22 to simultaneously rotate and reciprocate. This in turn causes a plunger 24 to simultaneously rotate and reciprocate, drawing fuel into a high pressure chamber 26 and delivering it to each fuel injection nozzle (not shown) through each delivery valve 28. The fuel injection quantity is controlled by controlling the position of a control sleeve 30 on the plunger 24. The control sleeve 30 is displaceable in response to rotation of a lever 32 and/or a lever 34. The lever 32 is rotatable in response to movement of an accelerator pedal (not shown) of a vehicle, and the lever 34 is rotatable in response to movement of a centrifugal type governor 36. Injection timing is controlled by rotation of a roller holder 38. Rotation of the roller holder 38 is controlled by movement of a timer piston 40.

The suction chamber 18 is communicable with the high pressure chamber 26 through a fuel passage 42 including an intake port 44. The fuel passage 42 is opened or closed by means of a fuel cut solenoid valve 46 which consists of a guide sleeve or cylinder 48, a solenoid 50 placed around the cylinder 48, an armature or plunger 52 movable in the cylinder 48 between a first position (the illustrated position in FIG. 1) where it opens the intake port 44 and a second position where it closes the intake port 44, and a spring 54 urging the plunger 52 toward the second position. The plunger 52 is allowed to project to the second position under the bias of the spring 54 when the solenoid 50 is de-energized and is pulled to the first position when the solenoid 50 is energized.

Figure 2:
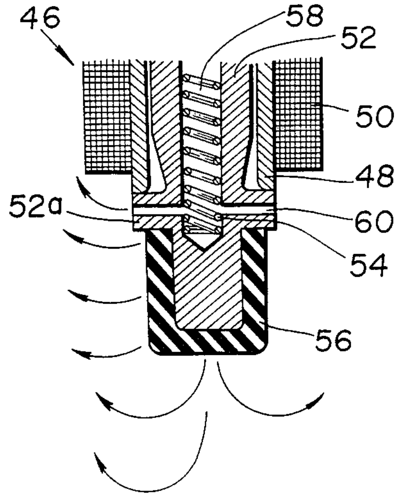
PRIOR ART FIG. 2
FIG. 2 is an enlarged fragmentary sectional view of the fuel cut solenoid valve of the fuel injection pump of FIG. 1.

As shown by an enlarged scale in FIG. 2, the plunger 52 is fitted at a lower end thereof with a cup-shaped rubber valve seat 56 for a better closing of the intake port 44. The plunger 52 is hollow and cooperates with the cylinder 48 to define therebetween a chamber 58. In order to prevent production of a negative pressure in the chamber 58, the plunger 52 is formed at its flange portion 52*a* with a transverse port 60 providing constant communication between the fuel passage 42 and the chamber 58.

When the solenoid 50 is energized, such a magnetic field as for example represented by arrows in FIG. 2 is induced, though the right-hand part of the magnetic field in the drawing is omitted. The plunger 52 is pulled by the effect of the magnetic field toward the aforementioned first position and held thereat through abutment of the flange portion 52*a* upon the lower end of the cylinder 48. In this instance, since the plunger 52 is being magnetized, it attracts thereon broken steel burrs, worn-off iron powder and the like magnetic solid particles which are suspended in the fuel passing through the fuel passage 42 since the working parts of the fuel injection pump are adapted to be lubricated by the fuel in the suction chamber 18.

Figure 3:
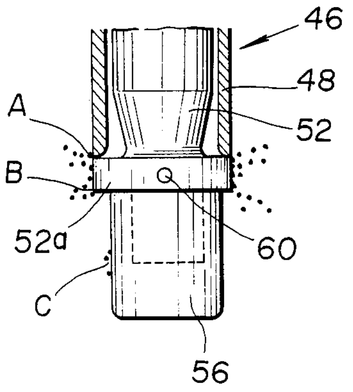
PRIOR ART FIG. 3
FIG. 3 is an enlarged partly sectional fragmentary view of the fuel cut solenoid valve of FIG. 1 and showing same in its condition in which a plunger is magnetized to attract iron powder as indicated by dots.

FIG. 3 shows by dots iron powder which is sprinkled over a magnetized plunger 52 to experiment on how the former is attracted by the latter. As will be seen from this figure, the iron powder is attracted concentrically on the portions A, B and C. The portions A and B are the corner portions of the flange 52*a*, and the portion C is a portion of the valve seat 56 covering an edge of the lower end of the plunger 52. From this, it is understood that a stronger magnetic fields is produced at those portions A, B and C, i.e., at or adjacent the corners or edges of the plunger 52 when the solenoid 50 is energized.

Figure 4:
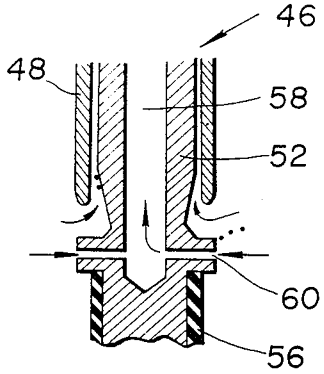
PRIOR ART FIG. 4
FIG. 4 is an enlarged fragmentary sectional view of the fuel cut solenoid valve of FIG. 1 and showing by arrows a flow of fuel caused when a solenoid is de-energized and the plunger is moving downward in the drawing.

FIG. 4 shows by arrows a flow of fuel caused when the solenoid 50 is de-energized and the plunger 52 is moving downward in the drawing. As will be seen from this figure, fuel is drawn into the chamber 58 not only through the transverse port 60 but also through the space between the cylinder 48 and the plunger 52. The magnetic solid particles attracted on the plunger 52, particularly on the corner portions A and B thereof, have a large possibility of going together with fuel into the space between the cylinder 48 and the plunger 52 to cause the both to seize up or to be accumulated thereat to cause a future seizing up of same. When such a seizure occurs, the fuel cut solenoid valve 46 cannot function properly, i.e., it cannot close the intake port 44 properly, but allows it to be kept open. An associated engine therefore cannot be stopped through an ignition key but keeps running even when the ignition key is turned to its OFF position.

Such a disadvantage encountered in the prior art device can be overcome by the fuel cut solenoid valve of the present invention which will be described hereinafter with reference to FIGS. 5 to 11, in particular. In FIGS. 5 to 11, like or corresponding parts to those of the prior art device are designated by the same reference numerals as their corresponding parts and will not be described in detail again.

Figure 5:
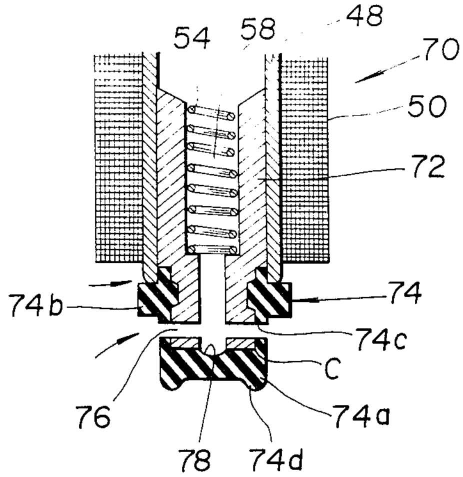
FIG. 5 is a fragmentary sectional view of a fuel cut solenoid valve according to an embodiment of the present invention.

Referring first to FIG. 5, a fuel cut solenoid valve according to an embodiment of the present invention is generally designated by 70 and comprises a plunger 72 made of a magnetic material and a valve seat 74 made of rubber or the like non-magnetic material. The valve seat 74 is formed to have a cup-shaped body 74*a* and an annular flange 74*b* adjacent the open upper end of the cup-shaped body 74*a*. The cut-shaped body 74*a* is fitted on the plunger 72 to completely cover the lower end portion of same projecting downward from the cylinder 48 when the plunger 72 is in its first position where it opens the fuel passage 42 (refer to FIG. 1), except for a transverse port 76 formed in the lower end portion of the plunger 72 for providing constant communication between the chamber 58 and the fuel passage 42. To this end, the cup-shaped body 74*a* is formed with a pair of diametrically opposed openings 74*c* which are aligned with the transverse port 76. The flange 74*b* is adapted to serve as a stopper for abutment upon the end of the cylinder 48 for thereby holding the plunger 72 at the first position when the solenoid 50 is energized. The valve seat 74 is also formed at the bottom of the cup-shaped body 74*a* with an annular projection 74*d* which forms a seating surface for assuredly closing the intake port 44.

Figure 6:
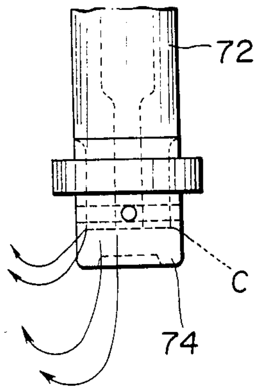
FIG. 6 is a fragmentary elevational view of the fuel cut solenoid valve of FIG. 5 and showing by arrows a magnetic field induced when a solenoid is energized.

The transverse port 74 is formed to be as large in diameter as possible and preferably at a position as close as possible to the edge portion C of the plunger 72 where a strongest magnetic field is produced as will be seen from FIG. 6. By this, it is intended to actively introduce the magnetic solid particles suspended in fuel into the transverse port 76 and allow them to be collected at a well 78 formed in the lower end of the plunger 72 in a manner to communicate the center portion of the transverse port 76.

The operation of the fuel cut solenoid valve 70 of the present invention will be described hereinafter.

When the associated engine is in operation, the plunger 72 is being pulled toward the first position thereof by the energized solenoid 50 and held thereat through abutment of the flange 74*b* upon the lower end of the cylinder 48 which is made of a non-magnetic metal. In this instance, such a magnetic field is produced around the lower end of the plunger 72 as shown by arrows in FIG. 6. As will be understood from this figure, a stronger magnetic field is not produced adjacent the flange 74*b* which is now made of a non-magnetic material such as rubber but at the bottom of the cup-shaped body 74*a* adjacent the lower edge portion C of the plunger 72. Accordingly, the suspended magnetic solid particles do not gather on the flange portion 74*b*, but on the bottom of the cup-shaped body 74*a* adjacent the edge portion C.

When the solenoid 50 is de-energized by stopping the current through it and thereby stopping the engine, the plunger 72 moves downward relative to the cylinder 48 under the bias of the spring 54, causing fuel to flow through the transverse port 76. The fuel also forms through the space between the cylinder 48 and the plunger 72 into the chamber 58 as indicated by arrows in FIG. 5. Since the suspended magnetic solid particles are attracted by the plunger 72 so as to gather concentrically on the bottom portion of the cup-shaped body 74*a* adjacent the lower edge portion C of the plunger 72, and not on the flange portion 74*b*, there is no possibility of their going into the space between the cylinder 48 and the plunger 72. The magnetic particles are urged to flow together with fuel into the transverse port 76 and to be collected in the well 78. The plunger 72 and the cylinder 48 are thus assuredly and reliably prevented from seizing up.

In the foregoing, it is to be noted that an important feature of the embodiment resides in the structure for preventing any magnetic solid particles from being magnetically attracted to the upper corner or edge of the flange portion 74*b*. In this embodiment, this feature is attained by forming the flange portion 74*b* from a non-magnetic material, such as rubber, and forming the flange integrally with the cup-shaped body portion 74*a* of the valve seat 74.

Figure 7:
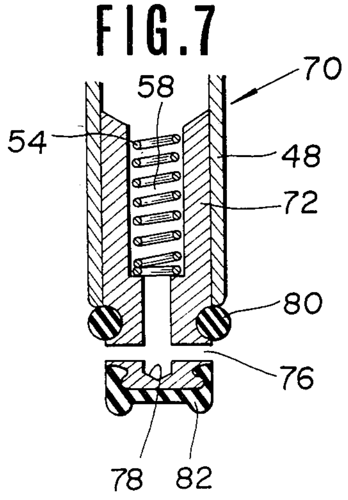

FIG. 7 shows a modified embodiment of the present invention.

In this modified embodiment, a flange 80 is formed into an O-ring which is separate from a valve seat 82. The O-ring 80 is adapted to function similarly to the flange 74*b* of the previous embodiment and is, of course, made of rubber or a like non-magnetic material. This embodiment features a lower manufacturing cost as compared with the previous embodiment and can produce substantially the same effect.

Figure 8:
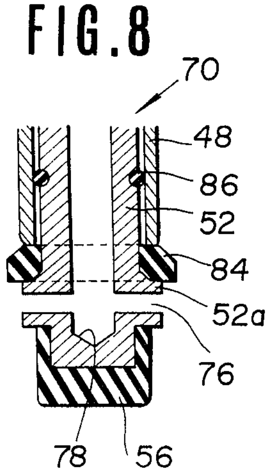

FIG. 8 shows a further modification of the present invention.

In this embodiment, a non-magnetic stopper ring 84 is provided in place of the flanges 74*b* and 80 in the previous embodiments. The stopper ring 84 is mounted on the plunger 52 on the upper end side of the flange portion 52*a* so that, when the solenoid 50 is energized, the stopper ring 84 is clamped between the lower end of the cylinder 48 and the flange portion 52*a* to hold the plunger 52 in the first position thereof.

This embodiment is further provided with a O-ring seal 86 which is mounted on the plunger 52 in a manner to provide a seal between the matching cylinder surfaces of the cylinder 48 and the plunger 52. Thus, when the solenoid 50 is de-energized to allow the plunger 52 to move downward, no fuel flows through the clearance space between the cylinder 48 and the plunger 52 into the chamber 58. Instead, the fuel staying in that space is driven by the O-ring seal 86 to flow out of the clearance space as the plunger 52 moves or projects downward from the cylinder 48.

This embodiment can produce, by the provision of the stopper ring 84, substantially the same effect as the previous embodiment. Further, it can provide more assured prevention of seizure. By providing the O-ring seal 86, downward movement of the plunger 52 does not cause fuel to be drawn into the chamber 58 through the space between the cylinder 48 and the plunger 52, but causes fuel in the space to be driven to flow out of there, thus urging the solid particles not to go into that space but to go out of same.

Figure 9:
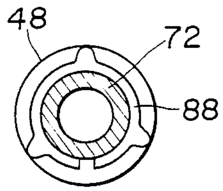
Figure 10:
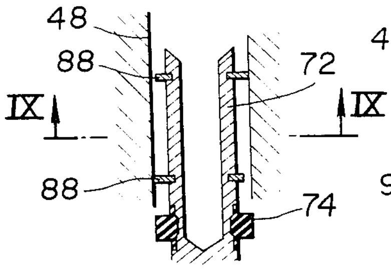

FIGS. 9 and 10 show a further modification of the present invention.

In this embodiment, the space between the cylinder 48 and the plunger 52 is increased so that the magnetic solid particles can move freely through the space and do not cause a seizure. To this end, a plurality of snap rings (two in this embodiment) 88 are mounted on the plunger 72 to guide same on the cylinder 48. As seen from FIG. 9, the snap ring 88 is formed to contact at part of the circumferential periphery thereof with the cylinder 48 so that the magnetic solid particles can flow freely even through the snap rings 88.

This embodiment is quite effective for assuring the prevention of the seizure, particularly when combined with the previous embodiments.

Figure 11:
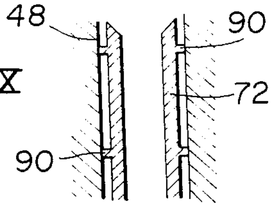

The snap rings 88 can be replaced by annular slide portions 90 which are integrally formed with the plunger 72 as shown in FIG. 11. That is, the plunger 72 of FIG. 11 has a plurality of axially spaced annular projections 90 on its outer circumferential surface to provide a large space between the cylinder 48 and the plunger 52. The projections are adapted to be in contact at part of the circumferential periphery thereof with the cylinder 48.

What is claimed is:

1. In a fuel injection pump having a fuel passage, a fuel cut solenoid valve for opening and closing the fuel passage, comprising:

- a cylinder made of non-magnetic metal and having first and second ends;
- a hollow plunger arranged to move in the cylinder, and arranged to move between a first position opening said fuel passage and a second position closing said fuel passage, wherein a first end of the plunger protrudes from the cylinder when the plunger is in the first position;
- a solenoid placed around said cylinder, and, when energized, for urging the plunger toward the first position, wherein magnetic field lines are directed through the plunger and out of said first end of the plunger when the solenoid is energized;
- a clearance space between the hollow plunger and the cylinder, wherein magnetic field lines passing through the plunger are directed away from the clearance space;
- a spring for biasing the plunger toward the second position;
- a stopper made of a non-magnetic material, mounted on the plunger and, when the solenoid is energized, for abutting the first end of the cylinder and thereby holding the plunger in the first position, wherein the stopper physically separates the first end of the plunger from the clearance space;
- a chamber defined by the cylinder and the hollow plunger, wherein the volume of the chamber varies as the plunger moves;
- a relatively large-diameter transverse port disposed substantially near said first end of the plunger, and for providing constant communication between the chamber and the fuel passage;
- a well opening into said transverse port and for collecting magnetic particles, wherein the well is centrally disposed in the plunger and nearer to the first end of the plunger than the transverse port, and wherein magnetic field lines are conducted through the plunger substantially near the well.

2. A fuel cut solenoid valve as set forth in claim 1, further comprising a valve seat made of a resilient non-magnetic material and having a cup-shaped body mounted on said plunger.

3. A fuel cut solenoid valve as set forth in claim 2, in which said stopper is an annular flange formed integrally with said valve seat.

4. A fuel cut solenoid valve as set forth in claim 2, in which said stopper is an O-ring which is formed independently from said valve seat.

5. A fuel cut solenoid valve as set forth in claim 2, in which said plunger has an annular flange portion, and in which said stopper is an annular ring mounted on said plunger at such a location that, when said solenoid is energized, said stopper is clamped between said end of said cylinder and said flange portion to hold said plunger at said first position.

6. A fuel cut solenoid valve as set forth in claim 1, further comprising an annular seal mounted on said plunger to provide a seal between matched cylindrical surfaces of said cylinder and said plunger.

7. A fuel cut solenoid valve as set forth in claim 1, further comprising a plurality of snap ring mounted on said plunger to guide same on said cylinder for thereby providing an increased space between said cylinder and said snap ring, said snap ring being in contact at part of the circumferential periphery thereof with said cylinder.

8. A fuel cut solenoid valve as set forth in claim 1, in which said plunger has a plurality of axially spaced annular projections on the outer circumferential surface thereof to provide an increased space between said cylinder and said plunger, said projections being in contact at part of the circumferential periphery thereof with said cylinder.

* * * * *